(12) United States Patent
Su et al.

(10) Patent No.: US 7,726,887 B2
(45) Date of Patent: Jun. 1, 2010

(54) CASE FOR ACCOMMODATING A CAMERA

(75) Inventors: Yu-Tsung Su, Taipei Hsien (TW); Ying-Chieh Tsai, Taipei Hsien (TW); Ming-Hui Chiu, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 266 days.

(21) Appl. No.: 12/024,952

(22) Filed: Feb. 1, 2008

(65) Prior Publication Data

US 2009/0074399 A1 Mar. 19, 2009

(30) Foreign Application Priority Data

Sep. 14, 2007 (CN) .................. 2007 1 0201699

(51) Int. Cl.
*G03B 17/00* (2006.01)
*H04N 5/225* (2006.01)
*B65D 85/38* (2006.01)

(52) U.S. Cl. .................. 396/423; 396/424; 348/376; 206/316.2; 224/908

(58) Field of Classification Search .................. 396/423, 396/424, 27, 29; 348/376, 375; 206/316.2; 224/908, 909

See application file for complete search history.

(56) References Cited

U.S. PATENT DOCUMENTS

| 6,305,537 B1 | 10/2001 | Jaffe |
| 2006/0110146 A1 | 5/2006 | Ariga |
| 2007/0175781 A1* | 8/2007 | Steiner et al. ............ 206/316.2 |

FOREIGN PATENT DOCUMENTS

| CN | 2909320 Y | 6/2007 |
| CN | 2919917 Y | 7/2007 |

* cited by examiner

*Primary Examiner*—Rochelle-Ann J Blackman
(74) *Attorney, Agent, or Firm*—Jeffrey T. Knapp

(57) ABSTRACT

A case for accommodating a camera includes a wrist cuff, a connector secured to the wrist cuff, and a strap having opposite ends coupled to the connector. The wrist cuff includes two elastic members, and a through hole with two openings at opposite ends of the through hole. The elastic members are arranged at opposite end portions of the wrist cuff for closing the openings when the elastic members are in normal state, and the elastic members are deformable so as to open the openings.

6 Claims, 5 Drawing Sheets

CASE FOR ACCOMMODATING A CAMERA

BACKGROUND

1. Field of the Invention

The present invention relates to a case for accommodating a camera.

2. Description of Related Art

Usually, a portable electronic device, such as a digital still camera, is accommodated in a case when the portable electronic device is not in use. For convenience, a typical case is connected to the camera by a strap. When the camera is in use, users hold the camera to take pictures while the case hangs from the camera strap. In this case, the case may swing in the wind or from movement of the user and reduce stability of the camera during picture taking. Further, should a user drop the camera during use it won't be protected.

What is needed, therefore, is to provide a case for accommodating a camera, in which the above problems are eliminated or at least alleviated.

SUMMARY

The present invention relates to a case for accommodating a camera. The case includes a wrist cuff, a connector secured to the wrist cuff, and a strap having opposite ends coupled to the connector. The wrist cuff includes two elastic members, and a through hole with two openings at opposite ends of the through hole. The elastic members are arranged at opposite end portions of the wrist cuff for closing the openings when the elastic members are in normal state, and the elastic members are deformable so as to open the openings.

Other advantages and novel features of the present invention will become more apparent from the following detailed description of present embodiments when taken in conjunction with the accompanying drawings, in which:

DETAILED DESCRIPTION OF THE EMBODIMENTS

Reference will now be made to the figures to describe at least one present embodiment in detail.

Figure 1:
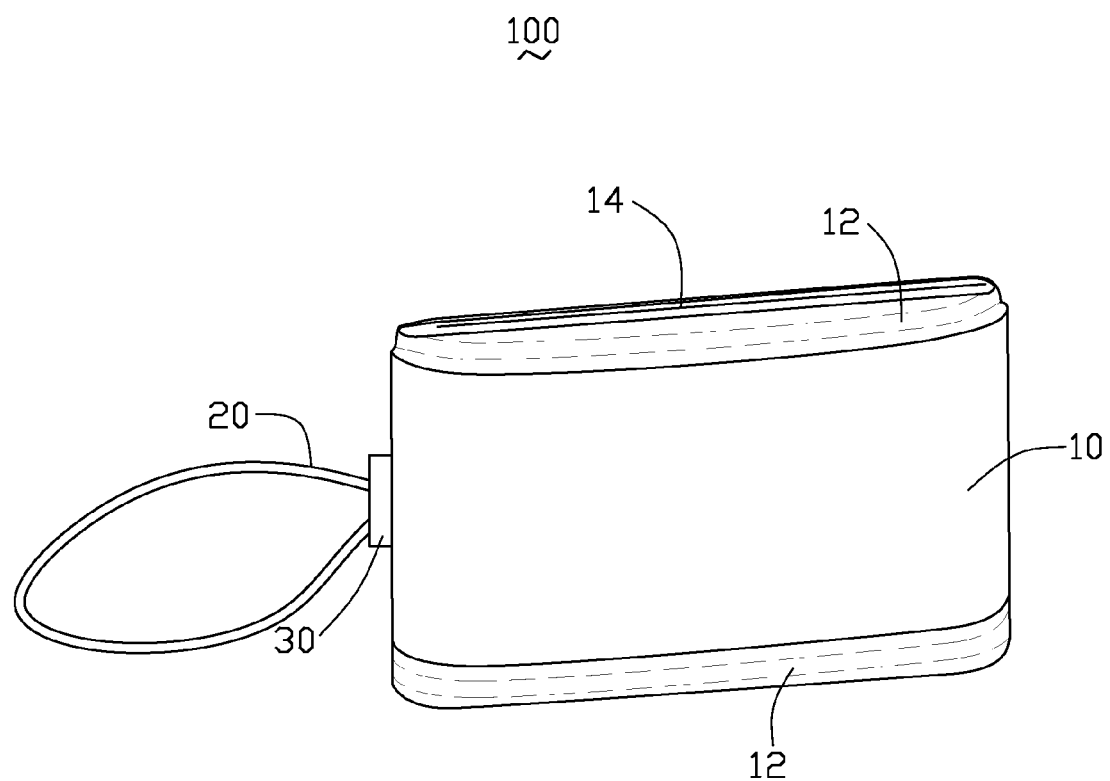
FIG. 1 is a schematic view of a case for accommodating a camera, in accordance with a present embodiment, showing the case closed.
Figure 2:
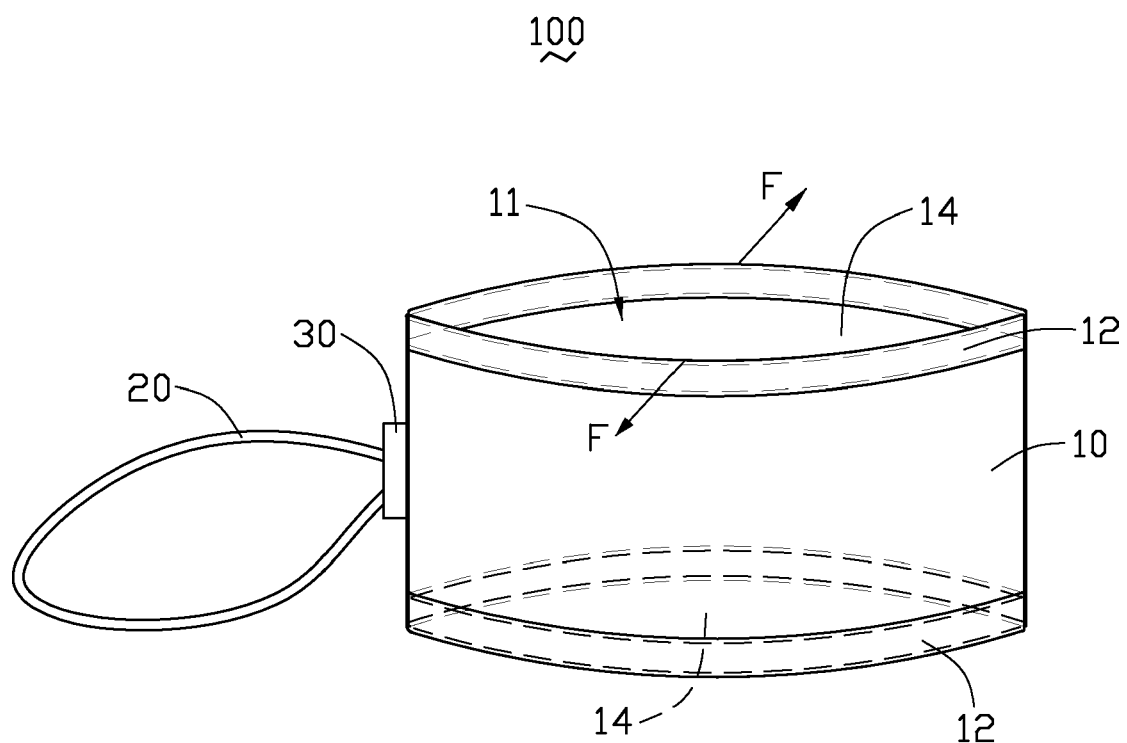
FIG. 2 is similar to FIG. 1, but showing the case opened.
Figure 3:
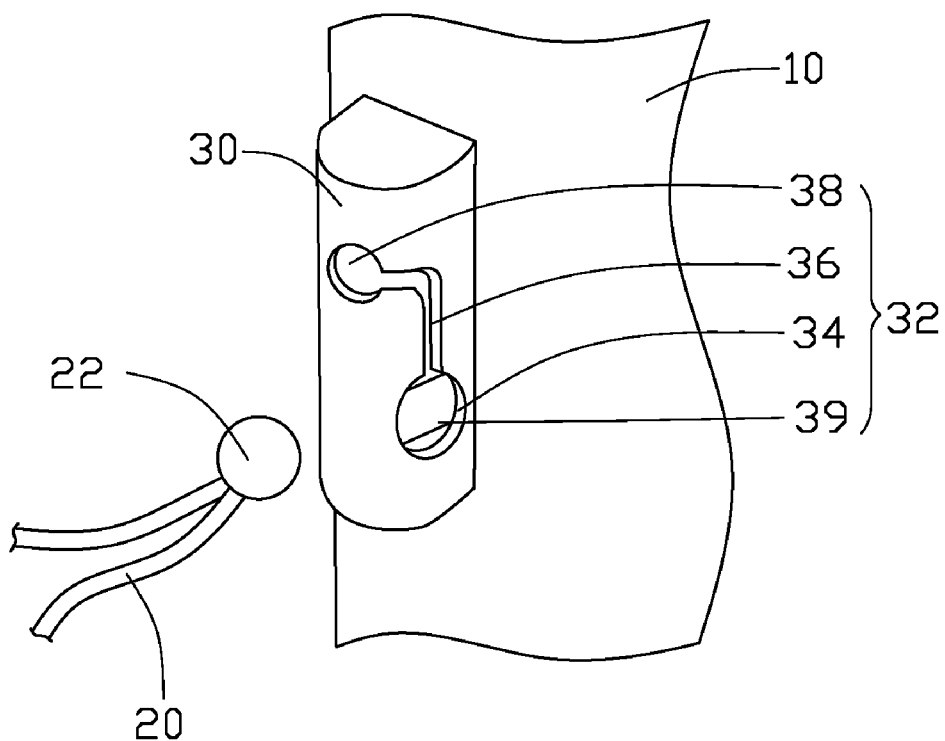
FIG. 3 is an isometric view of a connector in FIG. 1.
Figure 4:
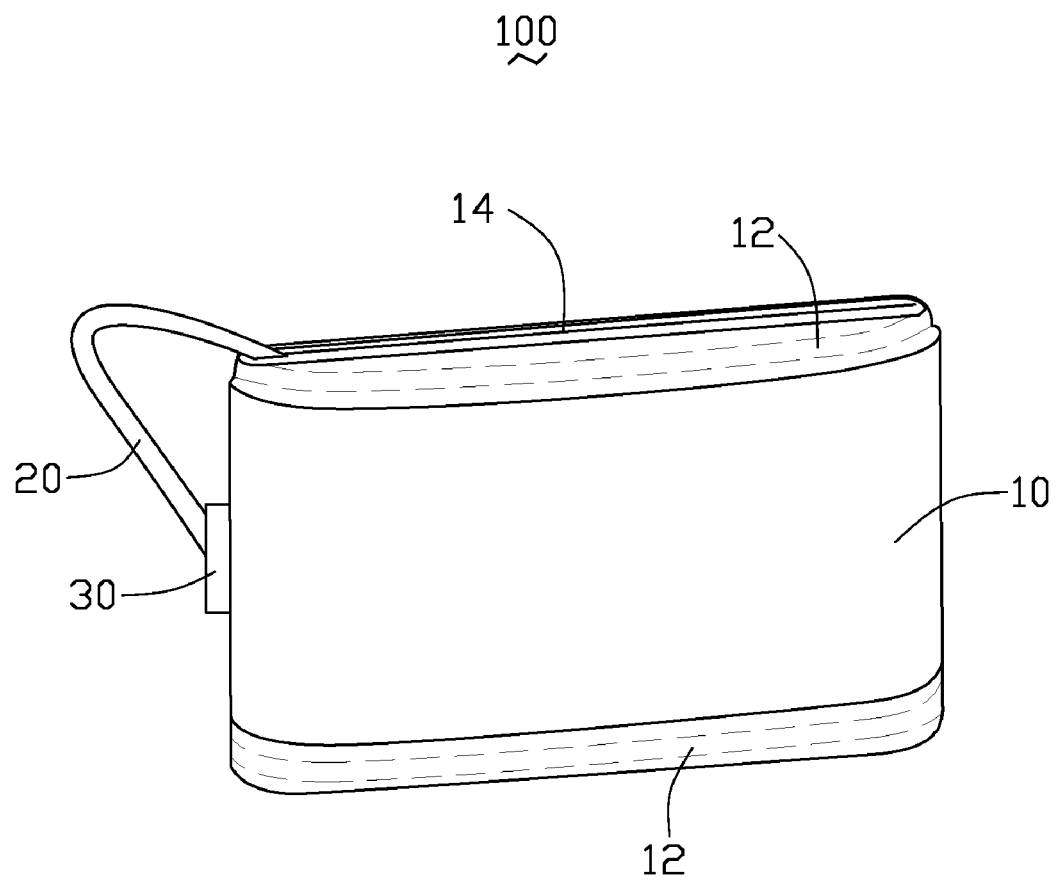
FIG. 4 shows a first usage state of the case of FIG. 1.

Referring to FIGS. 1, 2, and 4, a case 100 for accommodating a camera 200, in accordance with a present embodiment, is shown. The case 100 includes a wrist cuff 10, a strap 20, and a connector 30. The wrist cuff 10 includes two elastic members 12, and a through hole 11 with two openings 14 at opposite ends of the through hole 11. Each of the elastic members 12 is arranged at opposite end portions of the wrist cuff 10. The openings 14 are closed for accommodating the camera 200 when the elastic members are in an unused state thereof, and are opened when the elastic members is deformable in an used state thereof so that the wrist cuff 10 can be worn around a wrist 302 (see FIG. 4). When one elastic member 12 is pulled by a tension F, as shown in FIG. 2, the corresponding opening 14 is opened; when the tension F is canceled, the opening 14 is closed.

The wrist cuff 10 is made of flexible material, e.g., leather, and the elastic member 12 is comprised of shape memory metal, such as shape memory alloy in this present embodiment. Alternatively, the elastic member 12 may be comprised of rubber or the like.

The connector 30 is firmly secured to an outer wall of the wrist cuff 10, and the strap 20 has opposite ends coupled to the connector 30. The connector 30 includes an engaging portion 32. The strap 20 includes an engaging ball 22, and the opposite ends of the strap 20 are received in the engaging ball 22. The engaging portion 32 includes a first engaging hole 34, a guiding groove 36, a second engaging hole 38, and a leaf spring 39. The guiding groove 36 communicates the first engaging hole 34 and the second engaging hole 38.

A diameter of the first engaging hole 34 is approximately the same as that of the engaging ball 22, while a diameter of the second engaging hole 38 is smaller than that of the engaging ball 22. The leaf spring 39 is attached inside the engaging portion 32, and is changeable from a normal configuration to close the first engaging hole 34 to a deformed configuration to open the first engaging hole 34. In this present embodiment, to engage the engaging ball 22 within the first engaging hole 34, pressure is applied by a user to the engaging ball 22, and the leaf spring 39 is deformed in response to thereby open the first engaging hole 34. Finally, the engaging ball 22 is driven by the user to go from the first engaging hole 34 to the second engaging hole 38 via the guiding groove 36, and is received in the second engaging hole 38. Therefore, the strap 20 is connected to the wrist cuff 10 by coupling to the connector 30.

Figure 5:
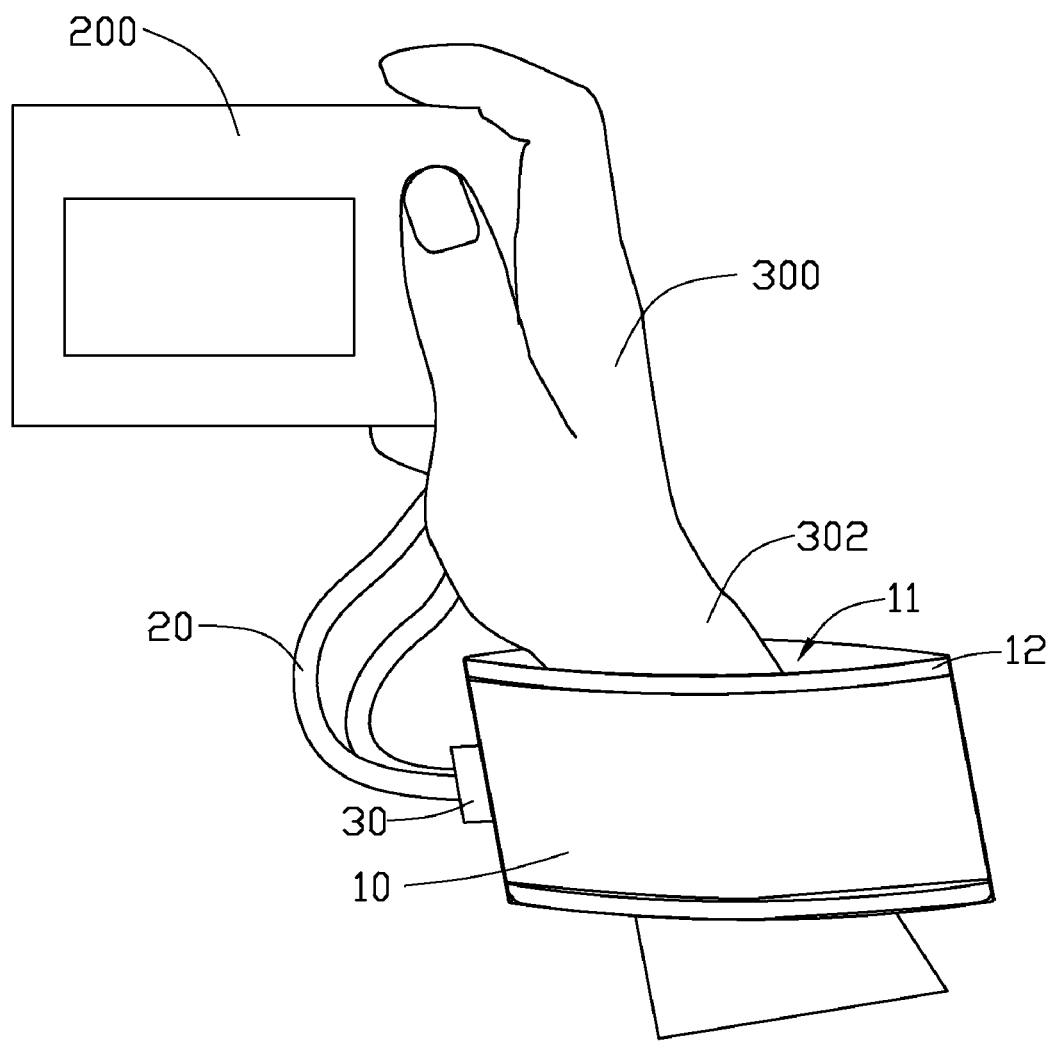
FIG. 5 shows a second usage state of the case of FIG. 1.

Referring to FIG. 4, a camera is connected to the strap 20, and is accommodated in the case 100 when the camera is not in use. Referring to FIG. 5, when the camera 200 is in use, the camera 200 is held by a hand 300 of the user, and the wrist cuff 10 is worn on the wrist 302 of the user via the through hole 11. When the user is taking pictures, the case 100 is held on the wrist 302 of the user. Even if the camera 200 is dropped from the hand 300 of the user, it is still connected to the wrist 302 of the user via the strap 20 and the wrist cuff 10. Therefore, stability of the camera 200 is maintained, and the camera 200 is protected when in use.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A case for accommodating a camera, comprising:
a wrist cuff comprising two elastic members, and a through hole with two openings at opposite ends of the through hole, the elastic members being arranged at opposite end portions of the wrist cuff for closing the openings when the elastic members are in normal state, the elastic members being deformable so as to open the openings, the elastic member being comprised of shape memory metal or rubber;
a connector secured to the wrist cuff; and
a strap having opposite ends coupled to the connector.

2. The case as claimed in claim 1, wherein the wrist cuff is comprised of leather.

3. The case as claimed in claim 1, wherein the connector comprises an engaging portion; and the engaging portion comprises a first engaging hole, a guiding groove, a second engaging hole; the guiding groove communicating the first engaging hole and the second engaging hole.

4. The case as claimed in claim 3, wherein the engaging portion further comprises a leaf spring being attached inside the engaging portion, and being changeable from a normal configuration to close the first engaging hole to a deformed configuration to open the first engaging hole.

5. The case as claimed in claim 4, wherein the strap comprises an engaging ball engaged in the second engaging hole, and the opposite ends of the strap are received in the engaging ball.

6. A case for accommodating a camera, comprising:

a ring-shaped flexible casing body comprising a through hole with two opposite openings at opposite ends of the through hole, the casing body being structured for fittingly surrounding a camera therein;

two elastic members being arranged at opposite ends of the casing body, the elastic members being configured for closing the openings in an unused state thereof, the elastic members being deformable to open the openings for removing the camera therefrom and function as a wrist cuff for extension of a hand of a user therethrough in an used state thereof, the elastic member being comprised of shape memory metal; and a strap having opposite ends coupled to the flexible casing body.

\* \* \* \* \*